March 17, 1959  J. L. DYESS  2,877,572
STUMP PULLER
Filed Nov. 9, 1956
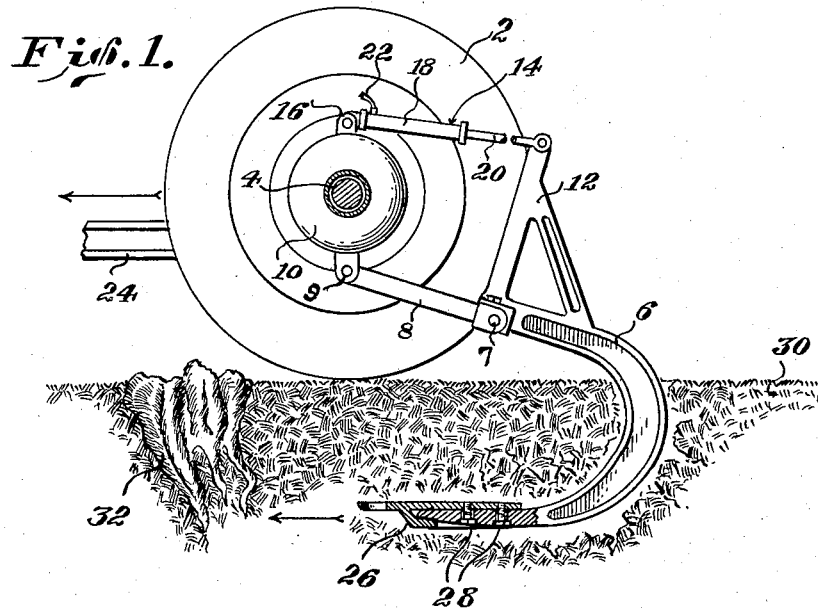
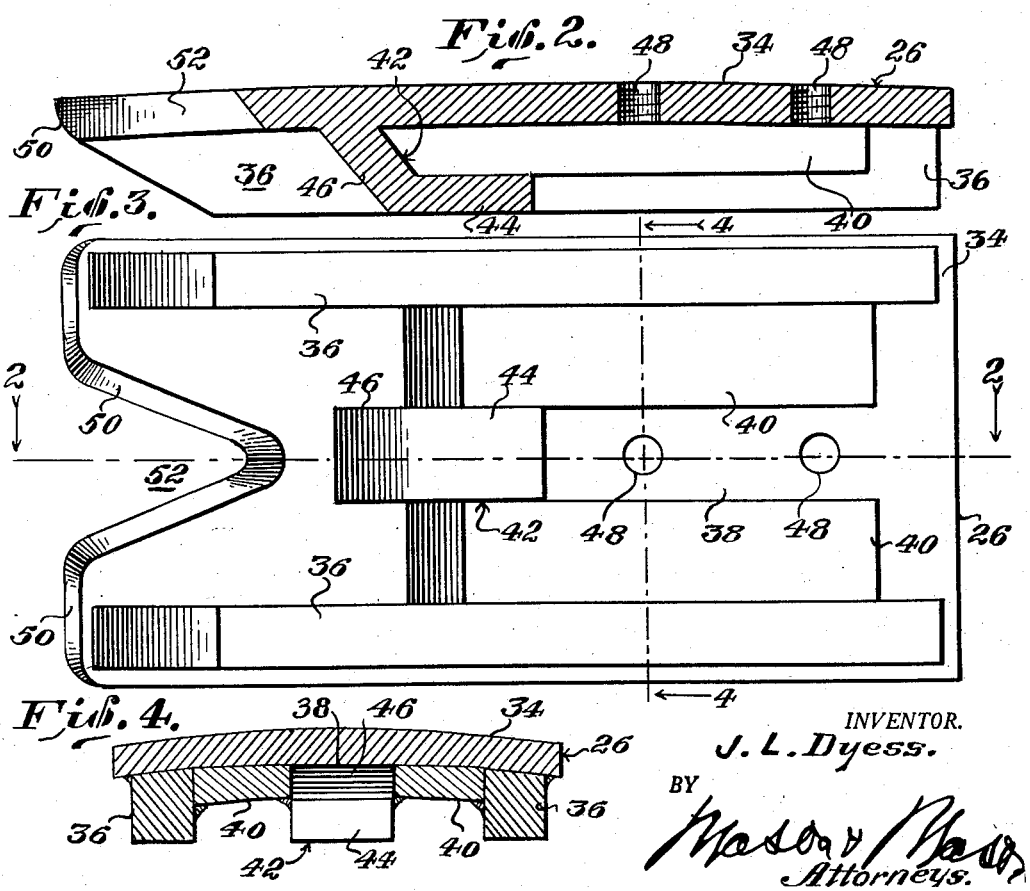
INVENTOR.
J. L. Dyess.
BY
Attorneys.

United States Patent Office 2,877,572
Patented Mar. 17, 1959

2,877,572

STUMP PULLER

James Loma Dyess, Webb, Miss., assignor to Richard H. Dyess, Tutwiler, Miss.

Application November 9, 1956, Serial No. 621,239

3 Claims. (Cl. 37—2)

This invention relates to a stump puller which is adapted to be detachably connected to a subsoiler.

The principal object of the present invention is to provide a stump puller attachment which may be used with existing makes of subsoilers.

Another object of this invention is to provide a stump puller element which may be attached directly to the cutting plate or toe of a subsoiler.

Still another object of this invention is to provide a stump puller attachment formed of reinforced sheet steel.

Other objects of the invention will appear hereinafter throughout the specification.

Referring to the drawing:

Figure 1 is a vertical sectional view of my stump puller attached to a subsoiler and with parts broken away.

Figure 2 is a vertical section through the stump puller element per se taken on the line 2—2 of Figure 3.

Figure 3 is a bottom plan view of the stump puller detached from the subsoiler; and Figure 4 is a vertical section through the stump puller taken on the line 4—4 of Figure 3 and inverted.

Referring now to the several figures of the drawing, Figure 1 shows a known form of subsoiler with my stump puller attached thereto. In the subsoiler shown, 2 represents one of the pair of wheels which are mounted on the ends of the axle 4. Also connected to the axle 4 is the beam 6 of the subsoiler which is pivotally connected at 7 to a supporting member 8 which in turn is pivotally connected at 9 to a supporting means 10 carried by the axle 4. As shown in Figure 1, the beam 6 is of substantially U-shape and has its lower end arranged in approximately a horizontal plane when in its operative position beneath the surface of the ground. Secured to the top of the beam 6 is a bracket 12 to the upper end of which a hydraulic lifting means 14 is attached, the other end of the lifting means being attached to the supporting means 10 at 16. As shown the lifting means comprises a cylinder 18 and a piston 20, a fluid supply for the cylinder being indicated at 22. Any suitable means, such as beams 24, only one of which is shown, may be used to connect the subsoiler to a tractor, truck or other source of power. Since the subsoiler per se is not a part of this invention only so much subsoiler structure has been shown as to clearly indicate how the subsoiler operates with my stump puller attached.

As illustrated in Figure 1, the free end of the beam 6 is flattened and tapered to form a cutting plate to which my stump puller 26 is attached by bolts 28. In this figure, the ground is represented by 30 and the stump by 32.

The stump puller element 26 comprises a main body plate 34 which is made of sheet steel having a thickness of about one-half inch, a width of about 7 inches, and a length of approximately 13½ inches. The plate 34 is reinforced on its lower side by a pair of spaced parallel bars 36 which are formed of tool steel and are about one square inch in cross section. The bars 36 are set in slightly from the edges of the plate 34 but it will be understood that they may be connected to the plate in any other suitable manner. Extending longitudinally of the plate 34 and on its lower side is a channel 38 formed by the two spaced tool steel bars 40 approximately rectangular in cross-section. The bars 40 are also secured to the plate 34 by welding or in any other suitable manner and are beveled at their outer ends as are the bars 36. The forward end of the channel 38 is closed by the abutment member 42 which is rigidly attached to the plate 34 and bars 40, as by welding. As clearly shown in Figure 2, the member 42 has a lower portion 44 spaced from the plate 34 and an end portion 46 extending upwardly and outwardly and connecting the plate 34 and the lower portion 44. The recess formed by the portions 44 and 46 receives the cutting plates of the beam 6 when the stump puller is attached to the subsoiler. Bolt openings 48 are provided in the bottom wall of the slot 38 to receive the bolts 28. These openings are made slightly larger than the bolts so that the bolts will not bear the strain of the forward movement of the stump puller, this strain being taken by the abutment member 42. As shown in Figures 2 and 4, the top surface of the plate 34 is curved slightly downwardly both forwardly and to the sides to facilitate the movement of the plate through the soil. By reason of the bevel 50 along the leading edge of the plate 34, the stump puller will have a tendency to move upwardly thus loosening the stump as the machine is moved forwardly through the ground. Also, the lifting means 14 may be used to aid in forcing the stump upwardly, if desired.

The dimensions of the parts which make up the stump puller element given in this specification are merely illustrative and may be varied as desired. Also, the means used to attach the stump puller to the subsoiler, as for example the number and arrangement of the bolts and bolt holes, may be varied to suit different makes or sizes of subsoilers.

While the subsoiler has been shown as being separate from the source of power, such as a tractor, it will be understood that it may be attached directly to the tractor in which case the wheels 2 would represent the wheels of the tractor, and the lifting means for the beam 6 would be the lifting means carried by the tractor.

The above description and drawing discloses one embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

1. A stump puller attachment comprising a substantially rectangular plate, a V-shaped notch in one end of said plate, longitudinally disposed ribs connected to the lower side face of said plate, each being arranged adjacent each side edge thereof, means forming a longitudinally arranged downwardly opening channel located between said ribs and centrally of said plate, the end of said channel adjacent said notch being closed to form an abutment for the member on which the plate is mounted, the open side of said channel adjacent said closed end also being closed to form a supporting portion arranged in spaced parallel relation to said plate.

2. A stump puller attachment as defined in claim 1, wherein said plate is arcuate in transverse cross-section and the ends of said ribs are bevelled toward said plate at their ends adjacent said notch.

3. A stump puller comprising a vehicle adapted to be moved forwardly over a surface of the ground, said vehicle comprising a beam supporting means, a beam depending from said supporting means, the lower end of said beam being disposed in a horizontal plane below the surface of the ground when in its operative position, the lower side of the lower end portion of said beam being inclined upwardly and outwardly, a horizontally disposed plate detachably secured to the upper side of said end portion, a V-shaped notch in the leading edge of said plate, a pair of longitudinally arranged ribs connected to the lower side of said plate in spaced parallel relation to form a centrally disposed channel, the end of said channel adjacent said notch being closed to form an abutment for the end portion of said beam, the open side of said channel adjacent said closed end also being closed to form a supporting wall arranged in parallel spaced relation to said plate.

References Cited in the file of this patent

UNITED STATES PATENTS

| | | |
|---|---|---|
| 1,750,116 | Miley | Mar. 11, 1930 |
| 1,986,853 | Rauch | Jan. 8, 1935 |
| 2,568,075 | Launder | Sept. 18, 1951 |
| 2,702,490 | Launder | Feb. 22, 1955 |
| 2,726,463 | Rogers | Dec. 13, 1955 |
| 2,734,290 | Tuttle | Feb. 14, 1956 |